Figure 1:
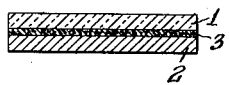

Feb. 26, 1935.  J. E. SNYDER  1,992,249

LAMINATED MATERIAL

Filed April 28, 1931

INVENTOR
James E. Snyder
BY
Wm. S. Pritchard
ATTORNEY

Patented Feb. 26, 1935

1,992,249

UNITED STATES PATENT OFFICE 1,992,249

LAMINATED MATERIAL

James E. Snyder, Kenmore, N. Y., assignor to Du Pont Cellophane Company, Inc., New York, N. Y., a corporation of Delaware Application April 28, 1931, Serial No. 533,412

19 Claims. (Cl. 154—46)

This invention relates to sealing, joining or laminating materials, such as sheets or films of regenerated cellulose, moistureproof materials including moistureproof sheets or films of regenerated cellulose, moistureproof paper, moistureproof sheets or films of gelatin and moistureproof sheets or films of cellulose derivatives, etc. to similar or non-similar materials. In one of its specific modifications, this invention also contemplates the combining of materials having dissimilar rates of contraction and expansion to produce a product which does not appreciably wrinkle and/or buckle when subjected or disposed to atmospheres or conditions which cause the materials to contract or expand.

Sheets or films of regenerated cellulose of the ordinary variety are neither moisture nor water resistant. In fact, they are susceptible to a gain or loss of moisture depending on the atmospheric conditions in which they are placed. The gain or loss of moisture is accompanied by swelling or shrinking respectively of the sheet. To a somewhat lesser degree, this phenomenon also occurs in sheets of paper, cardboard, boxboard, fabrics and other materials to which it is desired to laminate sheets or films of regenerated cellulose. Thus, when sheets or films of regenerated cellulose are laminated to paper, cardboard, boxboard, fabrics, scrim or other materials, the product, when subjected to atmospheres of different humidities, wrinkles, curls or buckles in one way or another depending on which material has the greater rate of change. This obviously results in a product which is not suitable for a number of uses.

In the production of laminated materials wherein one or more of the laminae consisted of sheets or films of regenerated cellulose, the ordinary types of aqueous adhesives were not capable of use. When these adhesives were employed, the sheets or films of regenerated cellulose at first swelled or became distorted and upon evaporation of the water shrank with the result that a smooth, even and plane product could not be secured. On the contrary, a buckled, wrinkled or curled product resulted.

Recently there has been developed a new type of moistureproof material. It consists of a suitable base, such as a sheet or film of regenerated cellulose, paper, gelatin, cellulose derivative, combined, as by being impregnated and/or thinly coated, with a moistureproofing composition containing a minor portion of a waxy substance. In the preferred modification the moistureproofing composition comprises a cellulose derivative, a resin, a wax or wax-like substance, with or without a plasticizer. The coating resulting from this composition is distinctly moistureproof, perfectly transparent, flexible, and possesses a surface satisfactory to the touch. In another of its modifications, the moistureproofing composition comprises a synthetic resin and a wax, and in still another, it comprises a drying oil and a wax, with or without a resin.

The widespread use of these moistureproof materials is limited to some extent by the ease of sealing, laminating or joining them to themselves or to other materials, such as paper of all types, fabrics, metal foils, cork, glass, etc.

Considerable time, effort and research have been expended in developing a suitable adhesive composition, and up to the present the adhesive compositions have invariably contained a volatile solvent or volatile solvent mixture, the evaporation of which is required in the setting of the joint. In the sealing together, for example, of two sheets of a moistureproof material, it is obvious that an adhesive which depends on the evaporation of water for proper setting will not be successful, since the evaporation of the water between the two sheets of the moistureproof materials is necessarily inhibited. If the medium to be evaporated is not water but some other substance or mixture, such as one or more organic materials, the evaporation thereof may be more rapid, but, since the evaporation still depends on the permeation of the moistureproof material, it will be slow and, in addition, it may destructively affect the material, producing distortion, loss of transparency, or some similar undesirable characteristic. This is particularly true when no drying equipment is provided. In such a case, the relatively slow drying, together with the permeation of the material, results in softening the moistureproofing coating and marring its appearance. Usually, it materially decreases the final moistureproofness of the product. When the combination is dried at elevated temperatures the appearance and moistureproofness of the resulting product is impaired.

When moistureproof sheets or films are to be laminated to paper, cardboard, boxboard, scrim, fabrics, cork, metal foil, etc. there is still another serious difficulty which must be overcome. Though the materials are moistureproof, nevertheless, as in the case of moistureproof sheets or films of regenerated cellulose, they show a gain or loss of moisture similar to the uncoated sheets as explained above, though at a decidedly lower rate. The resultant swelling or shrinking eventually will be of approximately the same degree as in the uncoated sheet. In other words, a sheet of moistureproof material exposed to a very humid atmosphere will finally come to the same or nearly the same equilibrium as uncoated sheets of material, but it will necessarily take a considerably longer period of time. The effect of this is that, if two sheets having different rates of swelling and shrinkage are laminated, there is a tendency for the product to wrinkle, curl or buckle in one way or another, depending on which material has the greater rate of change. This, of course, results in a laminated product which is, of course, not very satisfactory for a number of purposes.

I have found that the above-mentioned disadvantages may be overcome by providing and employing as hereinafter more fully described adhesives, specifically thermoplastic adhesives, containing as essential ingredients synthetic resins, such as certain of the polyhydric alcohol polybasic acid resins, polymerized terpene resins, alone or in combination with each other, with or without ingredients, such as rosin oil, Venice turpentine or the like. These adhesives, when in the molten condition, immediately function and, when the temperature is reduced to approximately normal, set. After the adhesives are in a set condition they not only are flexible and serve to combine the materials together, but also are subject to a cold flow, whereby as one of the materials tends to swell or shrink, slippage of one material with respect to the other is provided, with the result that buckling, wrinkling and/or curling in the product is appreciably reduced and minimized.

It is, therefore, an object of this invention to provide an adhesive for combining materials having dissimilar rates of contraction and expansion to produce a product which does not appreciably buckle, curl or wrinkle when subjected to conditions of the type mentioned.

Another object of this invention is to provide a thermoplastic adhesive which, in addition to uniting the materials having dissimilar rates of contraction and expansion, is also flexible and subject to a cold flow, so that as one or the other of the materials tends to shrink or swell, the adhesive permits the slipping of one material with respect to the other without impairing the adhesion, with the result that the laminated product remains in its substantially original flat and smooth condition.

A further object of this invention is to provide a thermoplastic adhesive possessing the characteristics just enumerated and containing as essential ingredients synthetic resins, such as certain of the polyhydric alcohol-polybasic acid resins, polymerized terpene resins, alone or in combination with one another, with or without other ingredients, such as rosin oil, Venice turpentine, or the like.

Another object of this invention is to provide a laminated product formed of a plurality of plies of material having dissimilar rates of contraction and expansion, said product having smooth and plane surfaces even when subjected to the conditions aforementioned.

An additional object of this invention is to provide a laminated material having at least one ply thereof consisting of a moistureproof material secured to the adjacent ply or plies by a thermoplastic adhesive containing as an essential ingredient one or more synthetic resins, and preferably also characterized by the fact that it is subject to a cold flow, so that as one of the plies tends to shrink or swell, slippage of one material with respect to the other is obtained with the result that the laminated material remains in its original flat and smooth condition.

Figure 2:
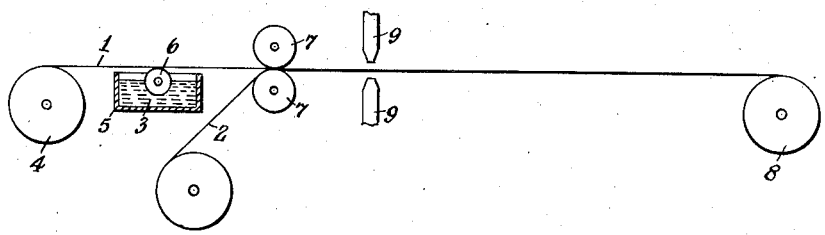
Figure 3:
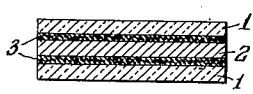
Figure 4:
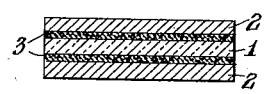

Other objects will appear from the following description, appended claims and accompanying drawing forming a part of this specification and wherein:

Figure 1 illustrates a section of one form of a laminated material which may be prepared in accordance with this invention;

Figure 2 diagrammatically illustrates one specific embodiment of the method constituting one part of this invention; and Figures 3, 4, 5, 6 and 7 are sections of modified forms of laminated materials which may be prepared.

Referring to the drawing wherein like reference numerals designate like parts, and particularly to Figure 1, the reference numeral 1 designates a material adhesively secured to a base 2 through the medium of an adhesive 3 hereinafter more fully described. The material 1 and the base 2 may have different and dissimilar rates of expansion and contraction occassioned by thermal, moisture or other physical or chemical changes.

The material 1 may be a sheet or film of regenerated cellulose, a moistureproof sheet or film of regenerated cellulose, a moistureproof sheet of paper, a moistureproof sheet or film of gelatin, a moistureproof sheet or film of a cellulose derivative, or the like.

As the base 2, numerous materials may be employed, illustrative examples of which are those which may be used as the lamina 1, paper of all types, fabrics, scrim, metal foil, metal screens, sheets of rubber, cork, glass and the like.

The adhesive 3 is a thermoplastic composition free of volatile solvents. It comprises, as essential ingredients, thermoplastic synthetic resins, such as certain of the polyhydric alcohol-polybasic acid resins, polymerized terpene resins, alone or in combination with one another, with or without other ingredients. When applied at a somewhat elevated temperature, it immediately functions and, when the temperature is reduced to approximately normal, it properly sets. In addition to firmly uniting the lamina 1 to the base 2, the adhesive is flexible and subject to a certain cold flow so that as one or the other of the laminæ tends to shrink or swell, slippage of one material with respect to the other occurs with the result that the laminated product remains in substantially its original flat and smooth condition.

The thermoplastic adhesive may be properly described as water-resistant. Consequently, the joints are not affected by exposure to humidity, such as would particularly occur when the moistureproof sheet is combined with cloth or other highly porous material. Being insoluble in water, the adhesive also imparts a certain degree of waterproofness to the product, especially to laminæ which are not water-resistant.

While I do not restrict this invention to any theory, it is my opinion that the thermoplastic adhesives described and employed function because of their tacky nature which, together with the flexibility, is retained in the final product. Even when a sheet of moistureproof material is laminated to a porous material, such as paper, I believe that at the interfaces of the adhesive and the moistureproof material the adhesive remains tacky and flexible, although it may harden upon exposed surfaces of the adhesive which has penetrated into the porous sheet. This is, in my opinion, contrary to the action of most adhesives containing a volatile solvent. In such adhesives it is my opinion that the solvent dissolves, softens or otherwise modifies the moistureproof coating to permit the binding of the adhesive base to the modified or exposed surface.

In order to more clearly explain the adhesive, there are hereinafter set forth several examples thereof which have given satisfactory results. It is to be understood that these examples are illustrative and not limitative of the invention.

Example I

| | Per cent |
|---|---|
| Polyhydric alcohol-polybasic acid resin | 75.0 |
| Polymerized terpene resin G | 21.2 |
| Polymerized terpene resin E | 3.8 |

The polyhydric alcohol-polybasic acid resin is the reaction product of:

| | Parts |
|---|---|
| Glycerin | 18 |
| Phthalic anhydride | 44 |
| Castor oil | 38 | when heated in an open kettle for 4 to 5 hours at 200° C. to give a final resin having an acid number of about 50.

The polymerized terpene resin G, sometimes known as "Flexoresin GG-1", has the following physical characteristics:

| | |
|---|---|
| Specific gravity (A.S.T.M. D-71-27) | 1.040 at 25° C. |
| Softening point (A.S.T.M. D-36-26) | 48° C. |
| Color (U.S. rosin standards) | E+ |
| Refractive index | 1.5262 at 25° C. |
| Penetration (A.S.T.M. D-5-25) | 25.5 at 25° C. |
| Acid number | 10.3 |

The polymerized terpene resin E, sometimes known as "Flexoresin E-1", has the following physical characteristics:

| | |
|---|---|
| Specific gravity (Westphal balance) | .9032 at 25° C. |
| Viscosity in poises | .914 at 25° C. |
| Color (Gardner-Holdt tubes) | #4½ |
| Refractive index | 1.502 |
| Acid number | 16.8 |

This adhesive is admirably suitable for laminating moistureproof material to paper, boxboard, cloth and similar materials.

Example II

| | Per cent |
|---|---|
| Polyhydric alcohol-polybasic acid resin | 58.0 |
| Polymerized terpene resin G | 19.0 |
| Polymerized terpene resin E | 23.0 |

The polyhydric alcohol-polybasic acid resin is the reaction product of:

| | Parts |
|---|---|
| Glycerin | 28.5 |
| Phthalic anhydride | 47.0 |
| Dist. cottonseed fatty acids | 24.5 | when heated in an open vessel at 180° C. for 1 hour followed by 4 to 5 hours at 225° C. to produce a final resin having an acid number of 25-30.

The polymerized terpene resins G and E are as described under Example I.

This adhesive has similar application to that disclosed in Example I, and, in addition, gives a firm joint at temperatures as low as −30° F.

Example III

| | Per cent |
|---|---|
| Polyhydric alcohol-polybasic acid resin | 55.5 |
| Polyhydric alcohol-polybasic acid resin | 44.5 |

The polyhydric alcohol-polybasic acid resin I is the reaction product of:

| | Parts |
|---|---|
| Ethylene glycol | 26.0 |
| Phthalic anhydride | 51.0 |
| Castor oil | 23.0 | by heating in a closed vessel with refluxing for 1 hour at 200° C. followed by heating without refluxing at 225° C. for 4 hours to produce a final resin having an acid number of 7-8.

The polyhydric alcohol-polybasic acid resin II is the reaction product of:

| | Parts |
|---|---|
| Ethylene glycol | 30 |
| Phthalic anhydride | 70 | when heated in an open vessel at 180° C. for 3 hours, followed by heating at 225° C. for 9 hours to produce a final resin having an acid number of 18-20.

Example IV

| | Per cent |
|---|---|
| Polymerized terpene resin G | 85.0 |
| Polymerized terpene resin E | 15.0 |

These polymerized terpene resins are as described in Example I.

In the specific examples given I have shown the proportions which give optimum joint strength upon ageing. Considerable variation in the proportions may be made without substantially altering the joint strength, and this invention contemplates the use of proportions which provide only a temporary joint, since in many cases this is a fixed desideratum.

According to the method of preparing the laminated material, the adhesive preferably at an elevated temperature is applied to one or both of the opposing surfaces of the materials to be united. The two materials are then united, preferably with the aid of pressure and with or without heat. Finally, the temperature of the material is caused to be reduced to approximately normal. In the latter step, auxiliary means may be employed to expedite the reduction in temperature.

The application of the hot adhesive to the films or sheets to be laminated results in a certain shrinkage which, particularly in the case of regenerated cellulose, aids the preparation of a laminated material which does not appreciably curl, buckle or wrinkle. Since this occurs just prior to the moment of laminating, the pre-shrinking of the regenerated cellulose is accomplished in a very simple manner without the use of auxiliary and expensive apparatus.

Referring to Figure 2 wherein a specific exemplification of one method is illustrated, a film of a material to constitute the ply 1 is wound from a suitable source of supply, such as a roll 4, and the adhesive applied thereto in any convenient manner, such as by flowing, coating, spraying, etc. The adhesive-applying mechanism specifically shown comprises a receptacle 5, preferably heated in any suitable manner, to maintain the adhesive 3 in a fused or liquid state. A roll 6 rotating partly submerged in the adhesive serves to apply the adhesive to the film 1 traveling thereover. The applying roll 6 may rotate in the same or opposite direction as the travel of the film. The quantity of adhesive applied may be controlled by a doctor blade (not shown) mounted in cooperative relationship with the applying roll. From the adhesive-applying mechanism, the coated film passes between a pair of pressure rolls 7, heated or not as desired. Prior to passing through the pressure rolls 7 the adhesive-coated film is superposed on the base 2 which is supplied from a convenient source, as a roll 8. The temperature of the laminated material, and especially the adhesive, is reduced to approximately that of the room, after which the material is wound on the roll 8.

In order to hasten the setting, jets of air may be projected from nozzles 9 on to the laminated material after it issues from the pressure rolls. Alternatively, the laminated material may be passed over one or more suitably cooled rolls. In the event that auxiliary means are not employed to accelerate the setting, the wind-up roll 8 is positioned at such a distance from the pressure rolls 7 that the material, prior to being wound, assumes its natural set position.

Instead of applying the adhesive to the film constituting the ply 1, it may be applied to the other material. Alternatively, it may be applied to both of the opposing surfaces.

It is apparent that the product may be of many forms other than that illustrated in Figure 1. For example, the laminated material constituting one phase of this invention may comprise a plurality of sheets or films 1 having the base 2 disposed therebetween. In such a case there will be two layers of adhesive 3. Similarly, a sheet or film 1 may be intermediately disposed between two plies of the material 2.

Figure 5:
Figure 6:
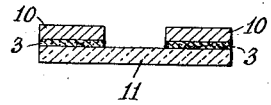
Figure 7:
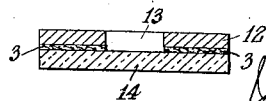

Instead of making the product by exactly superimposing sheets of the same size, the laminae 1 and 2 may be staggered relative to each other as illustrated in Figure 5.

It is also within the purview of this invention to secure strips of materials in spaced relationship on a suitable base. For example, strips 10 formed of any suitable opaque material may be secured in spaced relationship onto a base 11 preferably formed of a transparent material. It is to be understood that any number of strips 10 may be secured to the base 11. If desired, the edges of the strips 10 may project beyond the edges of the base 11 or vice versa.

In another modification, the invention contemplates the lamination of an opaque material 12 having a cut-out portion 13 onto a suitable transparent material 14 which may extend over the entire surface of the sheet 12 or just sufficiently to cover the cut-out portion 13. This form is especially suitable for the manufacture of transparent envelopes.

When materials of the type just described are desired, the adhesive may be applied to both surfaces of the intermediate ply, or the adhesive may be applied to the surfaces of the outer laminae which oppose the inner ply. If desired, the adhesive may be applied to all the contacting and opposing surfaces.

The appearance of the product may be materially enhanced by printing, painting, stippling, embossing, or the like, the various plies and/or employing variously colored or decorated moistureproof sheets or films.

The method previously described contemplates the application of a fused or softened thermoplastic adhesive to at least one of the opposing surfaces of the materials to be united in a continuous procedure as the materials proceed to the liminating mechanism. As an alternative, the present invention also contemplates and provides an intermittent process. According to this modification, the adhesive in a molten, softened or liquid condition is applied to one of the materials to be united and permitted or caused to set, whereby a material capable of being rolled or otherwise handled and having a set thermoplastic coating is produced. This coated material may be laminated to any suitable material in a subsequent and entirely different operation upon merely rendering the adhesive tacky by heat.

In actual practice, the adhesive may be first rendered tacky by heat and thereafter secured to the other laminæ by pressure. If desired, the coated material may be disposed with the coated surface thereof in contact with the material to be combined and the uniting or combination of the materials effected by the simultaneous application of heat and pressure.

In the modified method described, it is apparent that the adhesive may be applied in a heat-softened state. If a very thin layer of adhesive is desired, the material may be dissolved in some suitable solvent which, after the application of the adhesive solution to the desired material, may be evaporated. When the adhesive solution is to be applied to moistureproof materials of the type herein described, the solvent, of course, should be one which is indifferent, or substantially so, to the moistureproofing composition.

Though the above modified procedure is described in connection with a process of laminating, it is not restricted thereto. It may be equally applicable in the production and application of adhesive to stamps, labels, sealing tapes, price tags, trade-marks, and the like, which may be applied to various materials including moistureproof materials upon the mere application of heat and pressure, either separately or simultaneously.

The adhesives hereinbefore specifically described are only lightly colored and transparent. If desired, they may be colored by a suitable coloring agent, such as a dye or pigment, or rendered opaque by the addition of a suitable filler.

It is to be understood that the adhesives though specifically described in connection with the sealing of moistureproof materials, such as moistureproof sheets or films of regenerated cellulose, moistureproof sheets or films of gelatin and moistureproof sheets or films of cellulose acetate or lamination thereof, to various bases are not restricted to only such uses. The adhesives herein described are equally useful for sealing sheets or films of cellulose acetate, sheets or films of cellulose nitrate, sheets or films of regenerated cellulose coated with various compositions, such as cellulose nitrate, cellulose acetate, etc. and joining or laminating these materials to various bases.

Though the invention has been described with particular reference to the forms of a liminated material, it is not restricted thereto. The invention may be successfully applied in the sealing of wraps comprising the moistureproof sheets or films hereinbefore mentioned and in the production of various articles, such as containers of all kinds, made from moistureproof materials. The terms "securing", "uniting", "sealing", "laminating", "laminated material", and equivalent terms employed in the claims and description are intended to also embrace and cover these uses.

Since it is obvious that various changes and modifications may be made in the above description without departing from the nature and spirit thereof, this invention is not restricted thereto except as defined in the appended claims.

I claim:

1. A laminated material which does not appreciably buckle, curl or wrinkle and has the property of normally lying flat comprising a plurality of plies of materials having dissimilar rates of expansion and contraction secured together by a thermoplastic adhesive subject to cold flow and containing one or more synthetic resins selected from the class which consists of polyhydric alcohol-polybasic acid resins and polymerized terpene resins as essential ingredients, one of said materials being of the class which consists of sheets or films of regenerated cellulose, sheets or films of cellulose derivatives and sheets or films of resins of either the plain, coated or moistureproof varieties.

2. A laminated material which does not appreciably buckle, curl or wrinkle and has the property of normally lying flat comprising a plurality of plies of materials having dissimilar rates of expansion and contraction secured together by a thermoplastic adhesive subject to cold flow and containing a polyhydric alcohol-polybasic acid resin and a polymerized terpene resin as essential ingredients, one of said plies being formed of a material of the class which consists of sheets or films of regenerated cellulose, sheets or films of cellulose derivatives, sheets or films of resins of either the plain, coated or moistureproof varieties.

3. A laminated material which does not appreciably buckle, curl or wrinkle and has the property of normally lying flat comprising a plurality of plies of materials having dissimilar rates of expansion and contraction secured together by a thermoplastic adhesive subject to cold flow and containing one or more polyhydric alcohol-polybasic acid resins as essential ingredients and one of said materials being of the class which consists of sheets or films of regenerated cellulose, sheets or films of cellulose derivatives and sheets or films of resins of either the plain, coated or moistureproof varieties.

4. A laminated material which does not appreciably buckle, curl or wrinkle and has the property of normally lying flat comprising a plurality of plies of materials having dissimilar rates of expansion and contraction secured together by a thermoplastic adhesive subject to cold flow and containing one or more polymerized terpene resins as essential ingredients and one of said materials being of the class which consists of sheets or films of regenerated cellulose, sheets or films of cellulose derivatives and sheets or films of resins of either the plain, coated or moistureproof varieties.

5. A laminated material which does not appreciably buckle, curl or wrinkle and has the property of normally lying flat having at least one ply consisting of a sheet or film of regenerated cellulose secured to the adjacent ply or plies by a thermoplastic adhesive subject to cold flow and containing as an essential ingredient one or more synthetic resins selected from the class which consists of polyhydric alcohol-polybasic acid resins and polymerized terpene resins.

6. A laminated material which does not appreciably buckle, curl or wrinkle and has the property of normally lying flat having at least one ply consisting of a sheet or film of regenerated cellulose secured to the adjacent ply or plies by a thermoplastic adhesive subject to cold flow and containing a polyhydric alcohol-polybasic acid resin and a polymerized terpene resin as essential ingredients.

7. A laminated material which does not appreciably buckle, curl or wrinkle and has the property of normally lying flat having at least one ply consisting of a sheet or film of regenerated cellulose secured to the other ply or plies by a thermoplastic adhesive subject to cold flow and containing one or more polyhydric alcohol-polybasic acid resins as essential ingredients.

8. A laminated material which does not appreciably buckle, curl or wrinkle and has the property of normally lying flat having at least one ply consisting of a sheet or film of regenerated cellulose secured to the adjacent ply or plies by a thermoplastic adhesive subject to cold flow and containing one or more polymerized terpene resins as essential ingredients.

9. A laminated material which does not appreciably buckle, curl or wrinkle and has the property of normally lying flat having at least one ply consisting of a moistureproof sheet or film secured to the adjacent ply or plies by a thermoplastic adhesive subject to cold flow and containing as an essential ingredient one or more synthetic resins selected from the class which consists of polyhydric alcohol-polybasic acid resins and polymerized terpene resins.

10. A laminated material which does not appreciably buckle, curl or wrinkle and has the property of normally lying flat having at least one ply consisting of a moistureproof sheet or film secured to the adjacent ply or plies by a thermoplastic adhesive subject to cold flow and containing a polyhydric alcohol-polybasic acid resin and a polymerized terpene resin as essential ingredients.

11. A laminated material which does not appreciably buckle, curl or wrinkle and has the property of normally lying flat having at least one ply consisting of a moistureproof sheet or film secured to the other ply or plies by a thermoplastic adhesive subject to cold flow and containing one or more polyhydric alcohol-polybasic acid resins as essential ingredients.

12. A laminated material which does not appreciably buckle, curl or wrinkle and has the property of normally lying flat having at least one ply consisting of a moistureproof sheet or film secured to the adjacent ply or plies by a thermoplastic adhesive subject to cold flow and containing one or more polymerized terpene resins as essential ingredients.

13. A laminated material which does not appreciably buckle, curl or wrinkle and has the property of normally lying flat having at least one ply consisting of a moistureproof sheet or film of regenerated cellulose secured to the adjacent ply or plies by a thermoplastic adhesive subject to cold flow and containing as an essential ingredient one or more synthetic resins selected from the class which consists of polyhydric alcohol-polybasic acid resins and polymerized terpene resins.

14. A laminated material which does not appreciably buckle, curl or wrinkle and has the property of normally lying flat having at least one ply consisting of a moistureproof sheet or film of regenerated cellulose secured to the adjacent ply or plies by a thermoplastic adhesive subject to cold flow and containing a polyhydric alcohol-polybasic acid resin and a polymerized terpene resin as essential ingredients.

15. A laminated material which does not appreciably buckle, curl or wrinkle and has the property of normally lying flat having at least one ply consisting of a moistureproof sheet or film of regenerated cellulose secured to the other ply or plies by a thermoplastic adhesive subject to cold flow and containing one or more polyhydric alcohol-polybasic acid resins as essential ingredients.

16. A laminated material which does not appreciably buckle, curl or wrinkle and has the property of normally lying flat having at least one ply consisting of a moistureproof sheet or film of regenerated cellulose secured to the adjacent ply or plies by a thermoplastic adhesive subject to cold flow and containing one or more polymerized terpene resins as essential ingredients.

17. A laminated material which does not appreciably buckle, curl or wrinkle and has the property of normally lying flat having at least one ply consisting of a moistureproof sheet or film of paper secured to the adjacent ply or plies by a thermoplastic adhesive subject to cold flow and containing as an essential ingredient one or more synthetic resins selected from the class which consists of polyhydric alcohol-polybasic acid resins and polymerized terpene resins.

18. A laminated material which does not appreciably buckle, curl or wrinkle and has the property of normally lying flat having at least one ply consisting of a moistureproof sheet or film of paper secured to the other ply or plies by a thermoplastic adhesive subject to cold flow and containing one or more polyhydric alcohol-polybasic acid resins as essential ingredients.

19. A laminated material which does not appreciably buckle, curl or wrinkle and has the property of normally lying flat having at least one ply consisting of a moistureproof sheet or film of paper secured to the adjacent ply or plies by a thermoplastic adhesive subject to cold flow and containing one or more polymerized terpene resins as essential ingredients.

JAMES E. SNYDER.